Figure 1:
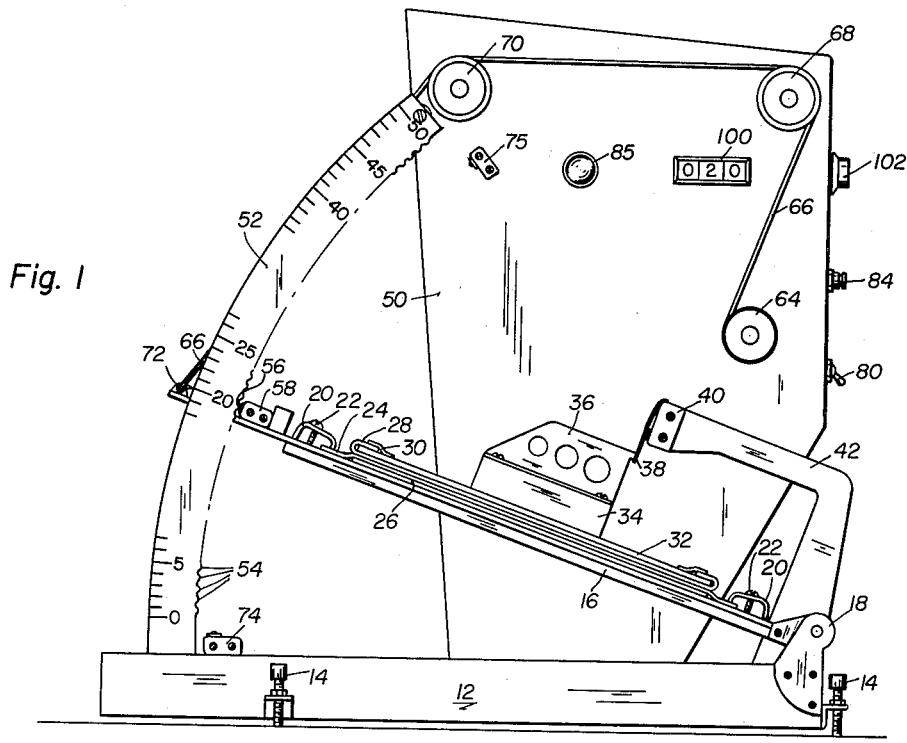

July 23, 1963

A. J. BEAUCHAMP 3,098,377

SKID RESISTANCE TESTER

Filed Jan. 16, 1961

INVENTOR.
Albert J. Beauchamp
BY
Buckhorn, Cheatham & Blore

ATTORNEYS

United States Patent Office 3,098,377
Patented July 23, 1963

3,098,377
SKID RESISTANCE TESTER
Albert J. Beauchamp, 108 N. 92nd Ave.,
Vancouver, Wash.
Filed Jan. 16, 1961, Ser. No. 82,970
3 Claims. (Cl. 73—9)

The present invention relates generally to a testing apparatus and is specifically directed to the determination of the frictional characteristics of various types of sheet material such as paper and paperboard.

As illustrative of the various uses to which the apparatus of the present invention can be put, reference is made to a problem in the packaging industry consisting of smooth surfaced paper cartons slipping on a high speed conveyor due to their lack of friction and causing a jam-up which usually results in a shut down of the conveyor. In order to overcome this problem an anti-slip material is sometimes added to the paper in order to provide the surfaces of these cartons with a higher coefficient of friction so that they will have less tendency to slip on the conveyor. The present invention is particularly adapted to test samples of paper so as to determine the tendency of the paper to slip.

While apparatus for measuring the frictional characteristics of paper have been previously made, none have operated with the simplicity, speed and accuracy of the present invention. This improved operation is due to the use of an electrical circuit for automatic control of test operation and automatic recording of the slippage angle of the material under test at the instant slippage occurs. While this circuit will be referred to in detail later, it may be briefly described as consisting of a reversible, synchronous motor controlled through a double pole relay by a starting switch and a slide tripping switch for reversing the motor when it is closed by movement of the test sample support which also disconnects an electromagnetic counter used for recording the angle of inclination of the test sample by means of a counting switch activated by the notches in an inclination angle scale.

Therefore, one object of the present invention is to provide an improved testing apparatus and method for the determination of the frictional characteristics of paper materials.

Another object of this invention is to provide an improved friction testing apparatus which operates in a simple, rapid and accurate manner.

A further object of the present invention is to provide a friction testing apparatus which operates automatically to cotrol the test and record its results by means of an electrical circuit.

Another object of this invention is ot provide a versatile, compact test apparatus which can be adapted to measure many properties of paper materials, such as smoothness, static friction and kinetic friction.

A still further object of the invention is to provide an improved method for testing paper materials as to their frictional characteristics.

Figure 2:
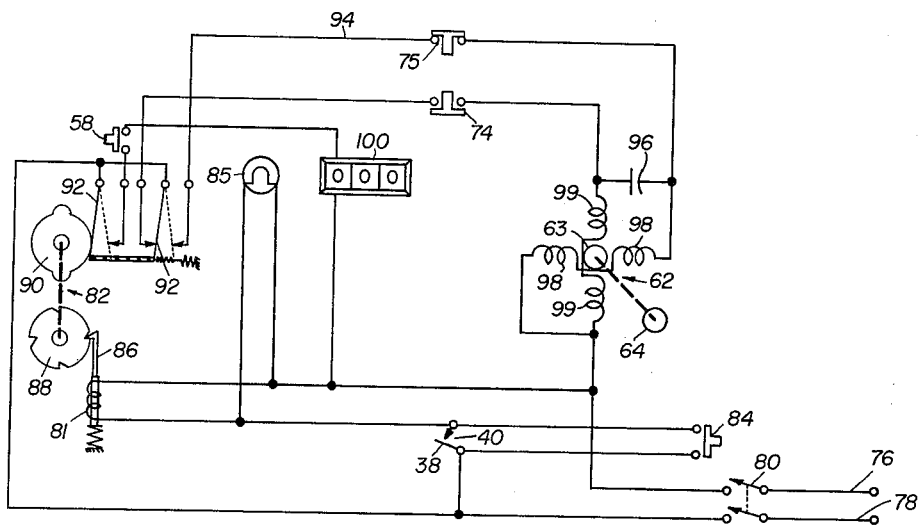

Other objects and advantages of the present invention will appear from the following detailed description of the preferred embodiment thereof when read in reference to the accompanying drawings in which:

FIG. 1 is a side elevation of apparatus made in accordance with the invention; and FIG. 2 is a schematic diagram of the control circuit for the apparatus of the invention.

With reference to the drawings, the apparatus of the invention has a frame including a base 12 adapted to be positioned upon a horizontal supporting surface. Leveling screws 14 may be provided on the base 12.

Mounted upon the base 12 is an elongate platform 16 which is supported for rotation about a horizontal axis by means of a hinge 18. Means are provided on the platform 16 for securing thereon a sheet of the paper to be tested and which means comprises a pair of clamps 20 having adjusting screws 22. The clamps 20 are adapted to engage the opposite ends of a first test sheet 24, of the paper whose frictional characteristics are to be measured, which is stretched over a smooth surfaced element such as a sheet of glass 26 attached to the upper surface of the platform 16.

A second test sheet 28 of the paper being tested is suitably secured by clips 30 to the underside of a smooth surfaced plate 32 made of a material similar to element 26 and weighted slide body 34 is attached to the upper side of said plate. Secured to the upper surface of the body 34 is a switch actuator plate 36 which is adapted to engage, and operate in a manner to be described, the switch operating lever 38 of a slide tripping switch 40 which is mounted upon an arm 42 extending upwardly from the platform 16.

Also fixed to the base 12 is a mounting plate 50 for supporting various components of the control circuit used in the apparatus and other elements as presently described. A curved scale member 52 is supported between base 12 and plate 50 by any suitable means and may be provided with degree graduations to indicate the angle of inclination of the platform 16 with respect to base 12. The scale element 52 is provided with a plurality of projections or pins 54 along an edge thereof which are adapted to be engaged by the detent 56 of a counting switch 58 to operate the latter in a manner to be described.

Means are provided for raising and lowering the platform 16 comprising a reversible self starting synchronous motor 62 having a rotor 63 connected through gearing (not shown) to drive a spool 64 about which is wound a suitable flexible element 66, such as a cable or bead chain, which extends over pulleys 68 and 70 mounted upon the plate 50, and which is secured at point 72 to the free end of the platform 16. Normally closed stop switches 74 and 75 are mounted on base 12 and plate 50 respectively, for tripping by the platform 16 so as to limit the rotation of platform 16 to the range of scale 52 and to disconnect motor 62 from its source of electrical power. The motor 62 is connected to a suitable source of power through a control circuit which will now be described.

Referring to FIG. 2, A.C. power for the motor 62 is supplied from a pair of conductors 76, 78 through a line switch 80. The conductor 76 is connected by such switch to one side of the actuating winding 81 of a ratchet and pawl latching type, double pole relay 82. The other side of the winding 81 is connected to the conductor 78 through the switch 80 and a normally open manual starting switch 84. The condition of the relay is shown when the platform 16 is in its horizontal or rest position and before the start of the testing sequence. Upon momentary closure of the starting switch 84 the winding 81 is temporarily energized by current flowing therethrough as indicated by a pilot light 85 connected in parallel therewith. The pawl 86 on the armature of relay 82 will be retracted when the winding 81 is energized to cause the ratchet 88 to be rotated one-quarter turn thereby. This rotation of ratchet 88 causes the cam 90 mechanically connected thereto also to rotate one-quarter turn, whereupon the cam lobes will swing the switch contacts 92 from the positions shown in solid lines to the positions shown in dotted lines. This will cause the circuit to be closed through the motor 62 extending from the conductor 78 through the switch contacts 92, conductor 94, limit switch 75, capacitor 96, motor windings 98—99 back to conductor 76. The closure of the switch 92 will also effect closure of a circuit extending from conductor 78 through normally open switch 58 to an electromagnetic counter 100 and back to the conductor 76. As the motor 62 operates to raise the platform, the switch 58 will be periodically closed as the detent 56 of the switch advances past the pins 54 on the indicator scale 52. This will cause pulses to pass through electromagnetic counter 100 to advance the counter and indicate in degrees the angle of elevation of the platform. Once the test is complete the counter may be reset to zero by manual control 102. In most cases indications of one degree differences in elevation angles will be sufficient, but if desired the differences of elevation angles could be indicated in half or quarter degrees, or at larger angle intervals if desired. As the platform raises the switch 74 will, of course, be permitted to close.

At the start of the test run, sample sheets 24 and 28 of test material are attached to platform 16 and slide body 34 respectively. The sample sheets 24 and 28 are then placed in contact with each other with the slide body 34 positioned horizontally on platform 16 so that the actuator plate 36 rests against switch 40.

It will be apparent that as the angle of inclination of the platform 16 increases, the tendency of the block 34 to slide will increase. At some point the force preventing the block from sliding will be overcome and the block 34 will slide downwardly relative to the platform 16. Since switch actuator plate 36 is placed initially in contact with the open switch operating lever 38, as the block 34 begins to slide the lever 38 of the tripping switch 40 will be depressed and cause the switch 40 to close. This tripping switch closure will cause closure of a circuit from the conductor 78 through the winding 81 of the relay 82 back to the conductor 76, whereupon the pawl 86 will be retracted to advance the ratchet 88 and the ganged cam 90 another quarter turn so that the switch contacts 92 will be returned to the positions shown in solid lines in FIG. 2. As a result current then flows from conductor 78 through closed contact 92, now closed stop switch 74, motor reversal capacitor 96, motor windings 98—99 and back to conductor 76. The phase angle between the currents flowing through windings 98 and 99 is reversed due to capacitor 96 now being placed in series with winding 98, instead of winding 99 as before, with the result that the direction of rotation of rotor 63 also reverses causing the coupled spool 64 to unwind flexible chain 66 and lower platform 16 until it strikes and opens stop switch 74 opening the circuit and shutting off motor 62. Finally, the slippage angle is recorded off counter 100, the counter reading is returned to zero by a manual reset control 102 and the apparatus is ready for another test run. The coefficient of static friction is, of course, the tangent of the slippage angle.

While the preferred embodiment of the present invention is described above in regard to testing paper and the like for static friction, it is also possible to determine kinetic friction by adding a timer to measure the length of time necessary for the weighted body to slide a given distance. In addition the glass mounting plates 26 and 32 may be eliminated when self-supporting material such as paperboard is tested.

Having illustrated and described a preferred embodiment of the invention, it should be apparent to those skilled in the art that the invention permits modification in arrangements and detail. I claim as my invention all such modifications as come within the spirit and scope of the appended claims.

I claim:
1. Apparatus for testing the static frictional characteristics of paper and the like comprising:
   a base,
   a slideway platform rotatably mounted on said base,
   a weighted slide body supported upon said platform for sliding movement thereon due to the force of gravity,
   mounting means for securing said paper between the adjacent surfaces of said platform and said body,
   a reversible motor connected to said platform for rotating said platform through several angles of inclination,
   indicating means coupled to the rotation of said platform for showing said angles of inclination,
   manual means for starting said motor to elevate said platform,
   means for detecting initiation of sliding movement of said body on said platform, and means operatively connecting said detecting means to said motor for reversing said motor automatically at the instant of time said body begins to slide on said platform so that the direction of rotation of said platform is reversed and the maximum reading obtained on said indicating means corresponds accurately to the actual angle of initial slippage of said paper.

2. In an apparatus for testing the frictional characteristics of paper materials, an electrical circuit for controlling the operation of said apparatus comprising:
   a reversible synchronous motor for raising and lowering an inclined plane in said apparatus,
   means for indicating the angle of inclination of said plane,
   relay means for connecting said motor and said indicating means to a source of electrical power and adapted to reverse the direction of rotation of said motor while simultaneously disconnecting said indicating means,
   switch means connected to said relay for energizing said relay and starting said motor to raise said plane,
   means connected to said relay for detecting the sliding movement of test material on said inclined plane and for energizing said relay to cause the reversal of said motor immediately upon this sliding movement so that said plane is lowered to its starting position, and
   circuit breaker means for disconnecting said motor upon the return of said inclined plane to its starting position.

3. Apparatus for determining the frictional characteristics of paper comprising:
   a frame,
   an elongated platform hingedly mounted at one end thereof on said frame for swinging movement about a horizontal axis parallel to said frame,
   means on said platform for securing to the upper surface thereof a sheet of paper to be tested,
   a sliding element mounted on said platform for movement longitudinally thereof,
   means on said element for securing to the lower surface thereof a second sheet of the paper to be tested so that said sheets of paper will engage one another, and an electrical circuit for operating said apparatus comprising,
   a reversible motor operatively connected to the free end of said platform to effect raising and lowering of the same,
   manually controlled means for connecting said motor to a source of power to cause said motor to raise said free platform end from a horizontal position so that the angle of inclination of said platform will be continuously increased,
   cumulative indicator means operatively connected to said platform operative to indicate the maximum angle of inclination attained by said platform, means to detect sliding movement of said sliding element, said last mentioned means being operative to effect reversal of said motor so that said free platform end will be lowered, and means to detect return of said platform to a horizontal position, said last mentioned means being operative to disconnect said motor from said source of power and to condition said circuit means for a recycle.

References Cited in the file of this patent
UNITED STATES PATENTS

| | | |
|---|---|---|
| 1,668,593 | Jones | May 8, 1928 |
| 1,772,415 | Carpenter | Aug. 5, 1930 |

OTHER REFERENCES

Article: Popular Science Monthly, September 1930, page 49.